Figure 3:
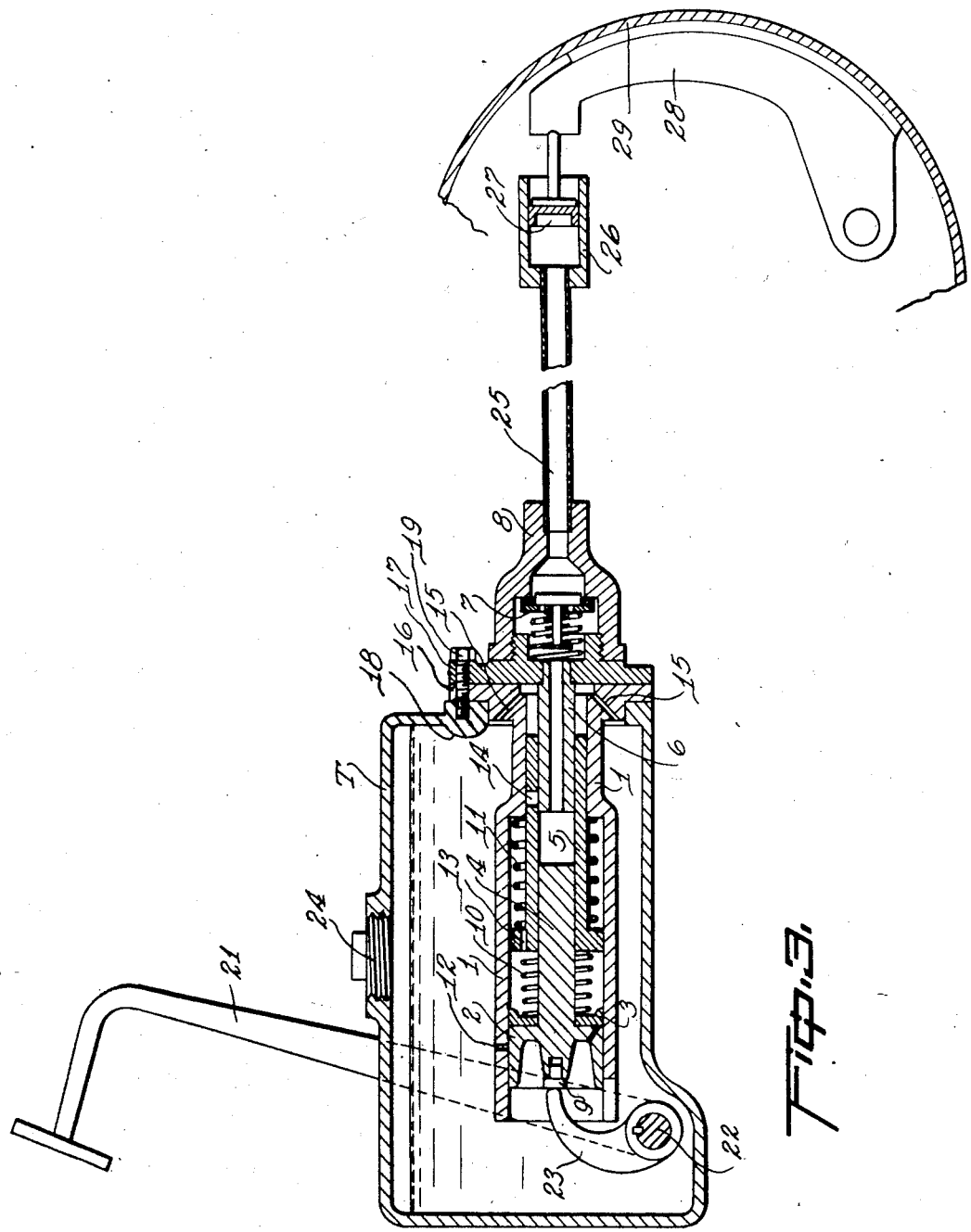

Jan. 3, 1933.                    M. RUEGG                    1,892,707
                        HYDRAULIC BRAKE MASTER CYLINDER
                           Filed Sept. 16, 1929        2 Sheets-Sheet 1
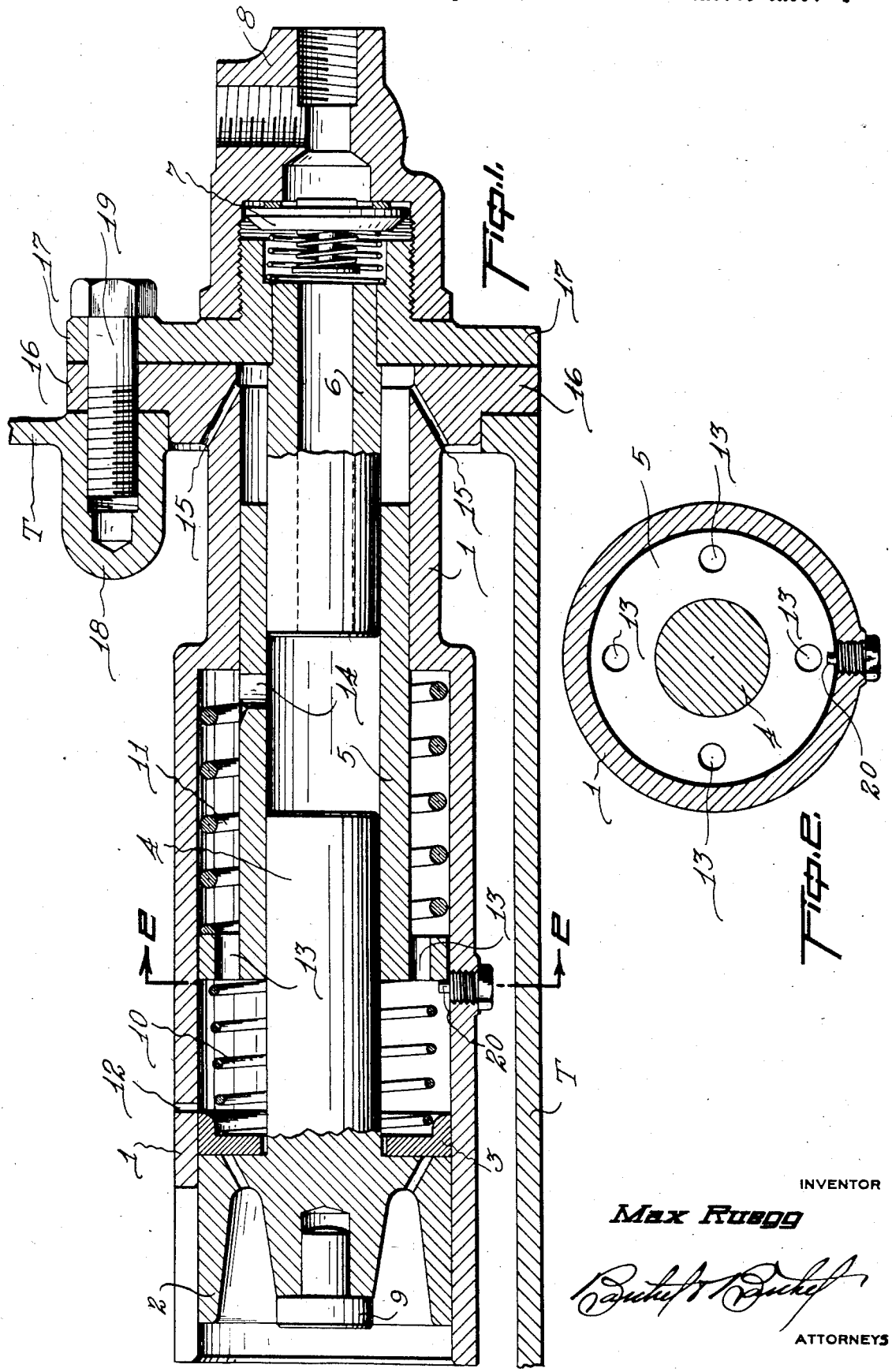
INVENTOR
*Max Ruegg*
ATTORNEYS Jan. 3, 1933. M. RUEGG 1,892,707

HYDRAULIC BRAKE MASTER CYLINDER

Filed Sept. 16, 1929 2 Sheets-Sheet 2

INVENTOR
Max Ruegg
BY
ATTORNEYS

Patented Jan. 3, 1933

1,892,707

UNITED STATES PATENT OFFICE

MAX RUEGG, OF DETROIT, MICHIGAN

HYDRAULIC BRAKE MASTER CYLINDER

Application filed September 16, 1929. Serial No. 392,819.

This invention relates to means for securing quickly, with minimum motion and effort, the highest possible fluid pressure for a given actuating force applied to the master compressor piston of the hydraulic braking mechanism of self-propelled motor vehicles and involves the use of a "differential" type of piston for effecting a practically immediate compensation for lost motion or "slack" due to wear or other causes.

The fluid pressure developed in a hydraulic braking system depends on the force applied to the braking pedal or hand lever, the leverage between the latter and the compressor piston, and the area of this piston. Leverage and piston area depend on the amount of piston travel necessary to bring the brake shoes into contact with the brake drum, allowing for wear of brake linings, and in turn piston travel is limited by the available travel for braking pedal or hand lever. If, therefore, in order to obtain a high fluid pressure, the leverage were gradually increased and the piston area decreased a limit representing the maximum available pedal or hand-lever travel would soon be reached, but with the present invention this limitation is obviated by the use of a two-diameter or differential piston in the master compressor cylinder, the idea being to utilize a large piston area when initially "taking up", absorbing, or compensating for all "clearance" in the system and then bring into service a small piston area for developing the high fluid pressure necessary for effective braking with relatively little movement of all parts.

Comparatively little pressure is required for the so-called "clearance take-up", making feasible the use of a relatively large piston area for producing initial movement of the braking mechanism, but as soon as the brake shoes come in contact with the brake drums the large-piston or low-pressure area is automatically cut out of service, whereupon the small-piston or high-pressure area is brought into action to set the brakes with a degree of force corresponding to traffic requirements at the moment of application.

Because of the greater low-pressure cylinder volume the liquid swept forward by the large-area piston produces a rapid clearance take-up movement, the smaller high-pressure cylinder volume and correspondingly reduced piston area serving not only to produce quickly a fluid pressure high enough to give effective braking but at the same time to lessen the applied foot-pedal or hand-lever force necessary to produce desired deceleration results.

The chief advantage of a master compressor having a double or differential piston over one having a single piston lies in its capacity for developing high fluid braking pressures with less physical effort without resorting to "servo" mechanisms such as vacuum "booster", for example, for assistance in applying brakes effectively.

Of the accompanying drawings in which the same reference numbers apply to like parts, Figure 1 is a longitudinal sectional view showing the master compressor cylinder and operative relationships of its pressure-creating differential piston and slide valve controlling application of pressure, and Fig. 2 is a cross sectional view taken along line 2—2 of Fig. 1, looking towards the outlet end of compressor cylinder and showing the sleeve-valve stop 20, small piston 4, and the sleeve-valve-flange openings 13 through which communication between the left and right ends of the compressor low-pressure cylinder is maintained continuously.

Fig. 3 is a sectional organization view indicating how foot-pedal actuation of master cylinder piston is accomplished and showing conventionally pipe line connections between the master cylinder and individual wheel-braking cylinders containing the pistons that force brake shoes into contact with brake drums when the brake pedal is depressed.

Some idea of operative relationships between the various parts of this device is given by the following tabulation of reference figures:

1—compressor low-pressure cylinder
2—large-diameter end of differential piston
3—packing for sealing large piston against leakage of liquid 4—small-diameter end of differential piston integral with that of large diameter 5—reciprocable sleeve-valve and high-pressure cylinder member, the concentrically-disposed flanged end of which fits the low-pressure compressor cylinder, while the smaller end fits the concentrically-disposed bore in the reduced or neck portion of the compressor cylinder body 6—fixedly-positioned hollow coaxially-disposed piston-like member projecting into high-pressure cylinder of the sleeve-valve member 5, from which liquid flows to brake-actuating cylinders 7—double-acting pressure-retaining valve 8—outlet fitting to which brake "lines" are connected 9—renewable hardened steel button against which bears the rounded-off end of lever arm through which differential piston is pushed into compressor cylinder by either hand lever or foot-pedal pressure 10—compression spring that returns piston to its initial position when hand-lever or foot-pedal braking pressure is released 11—compression spring of a "weight" or "load-carrying capacity" determined by brake-shoe return-spring force and area of brake-cylinder pistons 12—Passage through which braking fluid flows from supply tank into low-pressure compressor cylinder 13—passage through which braking liquid moves from the left end to the right end of low-pressure cylinder when compressor piston is moved inwardly 14—passage through which liquid flows from the compressor low-pressure cylinder into the high pressure cylinder of the reciprocable "floating" sleeve-valve member 5

15—passages through which braking fluid enters and is discharged from the annular space surrounding the hollow piston 6 when sleeve valve 5 is reciprocated.

16—pierced compressor cylinder body flange held to supply tank T by a superimposed flange 17 similarly pierced for a plurality of cap screws 19 that are screwed into inwardly projecting recessed and threaded supply-tank bosses 18

20—stop for limiting return movement of sleeve valve 5 under reaction of a compression spring 11 which is of greater "weight" than compression spring 10 and which therefore serves to prevent movement of the sleeve valve 5 before brake shoes make contact with brake drums.

21—foot pedal braking lever attached to brake pedal shaft 22 passing through wall of braking fluid tank T 23—master cylinder piston-actuating lever within brake-fluid supply tank T and contacting with hardened button 9

24—brake-fluid tank filler plug

25—braking-fluid pipe-line connection to individual brake-shoe actuating cylinders 26

27—fluid-pressure actuated piston in one of cylinders 26, the piston being pivotally attached to brake shoe 28 contacting brake drum 29".

The conventional schematic view presented in Fig. 3 indicates that the piston actuating lever 23 within the tank T, and which makes contact with the hardened button 9, is attached to the foot-pedal brake-lever shaft 22 which passes through wall of tank and is sealed to prevent leakage of braking-fluid therefrom. It shows also the pipe line connections 25 between the master cylinder outlet fitting 8 and brake-actuating cylinders 26 containing pistons 27 pivotally attached to brake shoes 28 forced into contact with brake drums 29 of vehicle wheels when depression of foot pedal forces master cylinder piston 2 to move inwardly.

Whether the master cylinder is slotted on the lower side, as shown in Fig. 3, to permit unobstructed movement of the piston-actuating lever 23, or on the upper side, as shown in Fig. 1, is not a matter of importance, location of the slot obviously depending on the position of the brake lever shaft 22, which may be above or below the master cylinder axis, whichever may be the more convenient.

As is customary, the compressor cylinder 1 is mounted within a closed tank T from which the brake-actuating fluid is taken. The "differential" or two-diameter piston 2 inside this open ended compressor cylinder, which, on its upper side, is cut away or slotted as shown, to permit unrestricted movement of an actuating lever arm directly above it, is adapted to be moved in brake-actuating direction by pressure applied by hand lever or foot pedal, and in the opposite, or brake releasing, direction by springs 10 and 11 that are compressed by the pressure applied to the piston, around which leakage of liquid is prevented by the cup-leather packing 3.

The small-diameter piston 4, integral with that of large diameter 2, fits into and reciprocates within the bore of sleeve valve 5, traveling with the latter in the direction of the outlet only when hand-lever or foot-pedal pressure is sufficient to overcome resistance of springs 10 and 11 and passage 14 is closed.

When the piston is in its quiescent position, as indicated by Fig. 1, the supply-tank liquid flows freely into the low-pressure end of the compressor cylinder through passage 12 therein and into the high pressure cylinder and hollow stationary piston 6 through passages 13 and 14 in the cylindrical slide valve body, the liquid that seals the forward (right) end of the slide valve 5 being forced back into the supply tank T through passages 15 in the cylinder head flange 16 when the slide valve 5 moves forward (to the right) under pressure produced by movement of the large piston 2 when pressed forward (right) by foot-pedal or hand-lever end bearing on button 9.

A flanged cover plate 17, to a threaded boss on which is screwed the outlet cap 8, holds the flanged end of the compressor cylinder tightly against the supply tank outer wall, which is provided with inwardly projecting bosses 18 recessed and threaded to receive the cap screws 19 that hold both cover plate and compressor cylinder flange in place.

The load-carrying capacity, or "weight", of the piston-returning compression spring 10 bearing on the cup leather 3 and on the larger flanged end of the slide valve 5 is sufficient to return the compressor piston to its inactive position, while that of the sleeve-valve control spring 11 depends on the area of the brake pistons and the brake-shoe return-spring force. When the brakes are released backward movement (to left) of the sleeve valve 5 under influence of spring 11 is limited by the stop 20 screwed into the compressor cylinder wall.

When force is applied at button 9 to drive the piston inward (to right) the whole area of both pistons comes into play to force liquid to the brake pistons. The large or low-pressure piston forces liquid into the high pressure cylinder through passages 13 and 14 only until the latter is closed automatically by forward movement of the slide-valve 5 due to the building up of fluid pressure on the flanged end thereof as the resistance to flow increases, complete closure of passage 14, with continued forward (to right) movement of the piston, resulting in the highest attainable pressure, the small area or high-pressure piston 4 then doing all the compressing.

During the initial forward movement of the piston all "clearances" in the system are taken up rapidly with comparatively little piston travel, correspondingly small pedal movement, and relatively light pedal pressure, yet when brake shoes make contact with drums and the compressor piston practically comes to a stop upon completion of the clearance takeup stroke, shifting of the seat of activity from the large to the small piston area, automatically effected by movement of the slide valve, is not accompanied by a demand for greatly increased pedal pressure to produce effective braking action with very slight pedal movement.

Obviously, in moving forward (to right) under the difference in pressure between the ends of slide valve 5, the slide valve 5 compresses the spring 11, which prevents such movement and compression during the clearance takeup stroke. When the pressure against the button 9 is released the spring 11 returns the sleeve and the spring 10 the piston to their normal inactive positions, as indicated by Fig. 1.

To give a smooth transition from low to high pressure operation, notches may be milled in the sleeve valve alongside the passage 14 as shown in Fig. 1, or the same effect may be obtained by drilling a series of small holes at the same place.

What I claim is:

1. A device for developing high fluid pressure in hydraulic braking systems, comprising an open-ended two-diameter master-compressor cylinder body having in wall thereof a normally open inlet port accommodating flow of braking fluid into the low pressure end thereof, said cylinder body being radially flanged at its outlet end, passages formed in the attaching flange accommodating a non-actuating inflow and outflow of braking fluid, a braking-fluid supply tank enclosing said cylinder body and detachably supporting it at its radially-flanged outlet end, said cylinder body projecting into said tank and braking fluid therein, means for attaching said compressor cylinder body to said fluid supply tank, a reciprocable two-diameter or differential piston within said cylinder body, a piston-head sealing member preventing leakage of fluid when piston passes inlet port in wall of low-pressure end of cylinder, ports formed in piston head behind sealing member, said ports being closed by said sealing member when piston moves inwardly on its compression stroke and opened by pressure of fluid when piston moves outwardly, a two-diameter ported sleeve-type sliding valve surrounding the inward end of small-diameter portion of said differential piston and movable therewith and independently thereof, a removable stop projecting through compressor cylinder wall to limit outward retractive movement of said sliding valve, a hollow fluid-conducting port-closing stationary piston opposite small-diameter end of said differential piston and projecting into said sliding valve, passages formed in the large-diameter portion of said valve permitting fluid to flow freely to opposite sides of said portion when valve slides back and forth, a port in the small-diameter wall of said sliding valve affording means of communication between the low-pressure section of compressor cylinder and high-pressure chamber created by movement of said sliding valve into the small-diameter portion of compressor cylinder to point just beyond end of hollow stationary piston, said movement effecting closure of port in sliding-valve wall, thereby cutting off communication with low-pressure end of compressor cylinder, further inward movement of differential piston and slide valve serving to increase pressure on braking fluid, a hardened lever-end contacting-button inserted in outer end of reciprocable piston where externally-derived piston-moving pressure is applied, compression springs for controlling fluid pressure up to time when movement of sliding valve effects transfer from low to high pressure operation of brake-cylinder pistons and for returning reciprocable piston and sliding valve to normally inactive positions, an outlet control valve providing for a two-way flow of braking fluid, and an outlet-valve cover or cap serving as a detachably-applied leakless housing for said outlet control valve, said housing being in communication with axially-disposed passage in stationary port-closing piston within high pressure chamber and having threaded openings for brake-cylinder pipe-line connections, substantially as shown and described.

2. In a hydraulic braking system for self-propelled motor vehicles, an open-ended two-diameter master compressor cylinder body, a fluid supply tank enclosing and detachably supporting said cylinder body, a two-diameter differential piston reciprocable within said cylinder body, a hardened lever-end contacting insert in outer end of said reciprocable differential piston to receive externally-derived actuating pressure that moves piston inwardly, a piston-head sealing member preventing leakage of fluid from compressor body cylinder when piston moves on its compression stroke, a ported reciprocable sleeve-type valve slidable upon the small-diameter portion of said differential piston and within the small-diameter portion of said cylinder body, an axially-pierced fluid-conducting stationary piston projecting into said sleeve-type valve at end opposite that into which projects the small-diameter portion of said reciprocable differential piston, said slide valve and reciprocable and stationary pistons forming within said master compressor cylinder body low and high pressure chambers normally in communication with each other through passages formed in the large-diameter portion of said sleeve-type sliding valve and a passage formed in the small-diameter portion thereof, communication with the low-pressure chamber being cut off when the port in small-diameter wall of sleeve-type sliding valve is closed by movement of valve into the small-diameter portion of cylinder to a point beyond end of axially-pierced stationary piston, which serves as a closure for the high-pressure chamber created by inward movement of said sleeve-type sliding valve, inlet passages formed in said reciprocable differential piston and wall of large-diameter portion of said compressor cylinder body admitting braking fluid to low-pressure chamber on outward movement of said piston, passages formed in the radial attaching flange at outlet end of compressor cylinder body accommodating a non-actuating inflow and outflow of braking fluid to and from annular space in small diameter end of compressor cylinder body wherein sleeve-type valve reciprocates, fluid flowing from low pressure chamber to brake-actuating cylinders under low pressure until all clearances due to wear are taken up, when continued movement of sliding valve in direction of fluid flow automatically effects closure of fluid admission port in slide valve by wall of small diameter cylinder of compressor body and wall of stationary piston, whereupon braking load is transferred to small-diameter portion of differential piston in high-pressure chamber, the brake-setting stroke being completed under high pressure, a removable stop projecting through large-diameter wall of compressor cylinder body and limiting outward movement of said sleeve-type sliding valve, compression springs controlling fluid pressure up to time when said valve effects transfer from low to high pressure operation of brakes and effecting outward retractive movement of said sliding valve and said reciprocable piston when brakes are released, an outlet valve controlling the flow of braking fluid to and from brake-actuating cylinders, a detachable housing sealably enclosing said outlet valve, said housing being in communication with compressor cylinder through axially-disposed outlet passage in said stationary port-closing piston and having threaded openings to which fluid supply pipe lines leading to brake-cylinders are connected, substantially as shown and described.

3. In an open-ended two-diameter master compressor cylinder body adapted for detachable application to the fluid-supply tank of a hydraulic braking system, said body projecting into the tank and fluid therein, an apertured attaching flange at outlet end of said body, a two-diameter differential piston reciprocable therein, inlet ports in large-diameter portion of said piston and an inlet port in wall of large-diameter portion of said compressor cylinder body to permit flow of braking fluid thereinto under atmospheric pressure, a piston-head sealing member preventing leakage of fluid from compressor cylinder and closing inlet ports of piston when latter moves inwardly on its compression stroke, the return stroke uncovering said inlet ports in piston to admit braking fluid to low-pressure end of compressor cylinder, an axially-disposed hardened contacting button inserted in outer end of piston to receive the externally-produced lever-end thrust which moves piston inwardly, an axially-apertured two-diameter sleeve-type ported slide-valve body reciprocable within said compressor cylinder body, sliding back and forth within the small-diameter portion thereof and upon the small-diameter portion of said reciprocable differential piston, an apertured fluid-conducting port-closing stationary piston held in axial alignment with said reciprocable piston and projecting into the coaxially-disposed reciprocable sleeve-type valve which slides thereon, compression-spring means effecting non-compressive return movement of reciprocable piston and slide valve, stop means for limiting return movement of said slide valve, passages in large diameter portion of said slide-valve body affording means of communication between fluid admission and expulsion ends of low-pressure cylinder of said compressor body, a combined low-pressure cylinder outlet and high-pressure cylinder admission port in wall of small-diameter portion of said sliding valve, inward movement of said reciprocable differential piston, accompanied by similar movement of sleeve-type sliding valve, forcing braking fluid from low-pressure cylinder into a cylindrical high pressure chamber created and closed against loss of fluid and consequent reduction of pressure by movement of sliding valve into small-diameter portion of cylinder body, said fluid-conducting stationary piston closing the inner opening and wall of small-diameter portion of compressor cylinder body, the outer opening of fluid admission port in small-diameter portion of said sliding valve, thereby cutting off communication between low and high pressure cylindrical chambers, continued inward movement of piston after closure of sleeve-valve port serving to increase pressure on fluid delivered to pipe lines leading to cylinders containing brake-actuating pistons, passages formed in compressor-body attaching flange to accommodate a non-actuating flow of braking fluid to and from the annular space and at inner end of sleeve-type sliding valve and surrounding fluid-conducting stationary piston for eliminating fluid resistance to movement of said valve, an outlet valve accommodating a two-way flow of braking fluid, and a detachable leak-proof housing for said outlet valve, said housing having threaded openings to which are connected pipe lines carrying fluid to brake cylinders.

4. In a hydraulic braking system, in combination, a fluid supply tank, a ported detachable open-ended two-diameter master compressor cylinder body, a ported two-diameter or differential piston reciprocable therein, a ported coaxially-disposed two-diameter reciprocable sleeve-type valve slidable upon the small diameter portion of said differential piston and within the cylindrical small-diameter portion of said compressor cylinder body, an axially apertured fluid-conducting stationary piston opposite said reciprocable differential piston, and in axial alignment therewith, said stationary piston projecting into said ported sleeve-type valve, said pistons and valve providing within compressor body low and high pressure cylindrical chambers that for low-pressure braking operation are in communication with each other through passages formed in the large-diameter portion of said sleeve-type slide valve and a suitably-located port in the small-diameter portion thereof, said communication being broken by inward movement of sleeve-type valve, the port in the wall of small-diameter portion thereof being closed when said valve passes into cylindrical small-diameter portion of compressor body and beyond end of said stationary piston, continued inward movement of slide valve and of differential piston serving to increase the pressure on the fluid forced to cylinders containing brake-actuating pistons, said differential piston being positively actuated by an externally-derived force applied to said piston, a hardened lever-end contacting insert in outer end thereof to which said force is applied, a piston head sealing member covering inlet passages in large-diameter portion of said differential piston and preventing leakage of fluid when such piston moves inwardly on its compression stroke, said inward movement of piston automatically closing inlet port in wall of large-diameter portion of compressor cylinder body, compression springs surrounding small diameter portions of reciprocable piston and sleeve-type sliding valve within compressor cylinder body serving to return them to their normally inactive positions when brakes are released, a removable stop projecting through large-diameter wall of compressor body serving to limit return movement of said slide valve, an outlet valve accommodating a two-way flow of braking fluid, a detachable leak-proof housing for said outlet valve, said housing having threaded openings to which are connected pipe lines conducting fluid to brake cylinders, and passages in compressor-body attaching flange accommodating a non-actuating inflow and outflow of braking fluid that seals small end of reciprocable sleeve valve as latter moves, substantially as shown and described.

5. In a hydraulic braking system, the combination of a fluid container, an open-ended axially-apertured master compressor cylinder body detachably applied thereto and projecting into the fluid therein, said body having a normally-open port admitting fluid to low-pressure end thereof, means for attaching said compressor cylinder body to fluid container, a differential or two-diameter piston reciprocable within said compressor cylinder body, a hardened lever-end contacting insert coaxially disposed in outer end of said piston taking externally-produced thrust effecting inward compression-stroke movement of piston, a plurality of fluid-admission passages formed in large-diameter portion of piston, a piston-head sealing member preventing leakage of fluid from compressor cylinder, said sealing member tightly covering inner openings of said passages when piston moves inwardly on compression stroke and uncovering them on return stroke thereof to admit fluid to low-pressure end of compressor cylinder body, a coaxially-disposed fluid-conducting stationary piston inwardly projecting into said compressor-cylinder body through axially-disposed outlet-end aperture thereof, a two-diameter reciprocable sleeve-type valve slidable within the small-diameter portion of said compressor-cylinder body and upon the axially-aligned opposite ends of said reciprocable and stationary pistons, said reciprocable piston and sliding valve serving, under operative conditions, to form cylindrical low and high pressure chambers within said compressor-cylinder body, a plurality of passages formed in large-diameter portion and a passage formed in small-diameter portion of sliding valve affording means of communication between said chambers, communication therebetween being severed by inward movement of slide valve when combined low-pressure chamber outlet and high-pressure chamber inlet port in wall of valve is closed by surrounding compressor-body wall and stationary piston as valve port passes beyond end of stationary piston, continued inward movement of valve and differential piston serving to increase pressure on fluid delivered to cylinders containing brake-actuating pistons, compression springs controlling fluid pressure up to time when sliding valve effects transfer from low to high pressure operation and producing retractive movement of piston and slide valve to normally inactive positions when brakes are released by withdrawal of force producing compression stroke of piston in master compressor cylinder body, a removable stop projecting through compressor cylinder body wall serving as means for limiting retractive movement of slide valve, passages formed in attaching flange of compressor cylinder body accommodating a non-actuating inflow and outflow of braking fluid that seals the small diameter end of sliding valve, preventing leakage under high-pressure operation, a coaxially-disposed outlet valve accommodating a two-way flow of braking fluid from and to compressor cylinder body, an apertured suitably-sealed detachable housing for said outlet valve, said housing having threaded openings to which are connected pipe lines leading to brake cylinders, substantially as shown and described.

In testimony whereof I affix my signature.

MAX RUEGG.